(12) United States Patent
Chen

(10) Patent No.: US 7,070,246 B2
(45) Date of Patent: Jul. 4, 2006

(54) WHEEL DEVICE WITH QUICK-RELEASING MECHANISM

(75) Inventor: Shun-Min Chen, Taipei Hsien (TW)

(73) Assignee: Wonderland Nurserygoods Co., Ltd. (TW)

( * ) Notice: Subject to any disclaimer, the term of this patent is extended or adjusted under 35 U.S.C. 154(b) by 136 days.

(21) Appl. No.: 10/660,134

(22) Filed: Sep. 11, 2003

(65) Prior Publication Data

US 2005/0057086 A1 Mar. 17, 2005

(51) Int. Cl.
*B60B 27/06* (2006.01)

(52) U.S. Cl. ............... 301/111.07; 301/111.01
(58) Field of Classification Search ............ 301/111.01, 301/112, 119, 120, 121, 111.02, 111.03, 111.04, 301/111.06

See application file for complete search history.

(56) References Cited

U.S. PATENT DOCUMENTS

| | | | | | |
|---|---|---|---|---|---|
| 956,031 | A | * | 4/1910 | Bergman | .................... 301/120 |
| 4,043,685 | A | * | 8/1977 | Hyams | ......................... 403/19 |
| 5,800,023 | A | * | 9/1998 | Hartenstine et al. | .... 301/111.07 |
| 5,938,294 | A | * | 8/1999 | Chan | ..................... 301/111.06 |
| 6,152,540 | A | * | 11/2000 | Lin | ........................ 301/111.06 |
| 6,280,001 | B1 | * | 8/2001 | Parker et al. | ............... 301/112 |
| RE37,390 | E | * | 9/2001 | Liao et al. | .............. 301/111.06 |
| 6,354,670 | B1 | * | 3/2002 | Cheng | ................... 301/111.04 |

* cited by examiner

*Primary Examiner*—Russell D. Stormer
(74) *Attorney, Agent, or Firm*—Gauthier & Connors LLP

(57) ABSTRACT

A wheel device with quick-releasing mechanism comprises a wheel body and an U-shaped movable member. The wheel body further has two tabs and an elastic element. The movable member further includes a first board having a first wall surface and a second wall surface each other in different planes, and an I-shaped second board restricted by the two tabs. When the movable member is at a first position and the first wall surface is aligned with a second section of a shaft, the wheel body can be escaped from the shaft. When the movable member is at a second position and the second wall surface is aligned with the second section of the shaft, the wheel body is restricted to the shaft by the movable member. In addition, the movable member having quick-releasing function is usually kept at the state of restriction due to the elastic element and/or a protrusion on the movable member.

11 Claims, 5 Drawing Sheets

US 7,070,246 B2

WHEEL DEVICE WITH QUICK-RELEASING MECHANISM

FIELD OF THE INVENTION

The present invention relates generally to a wheel device with quick-releasing mechanism, and more particularly to a wheel device with quick-releasing mechanism having a first wall surface and a second wall surface which are situated at different planes to each other.

BACKGROUND OF THE INVENTION

FIG. 1 is an exploded perspective view of a conventional wheel unit 9, comprising a circular wheel 90, a rod 92, and a restricting element 91, of a stroller or a push car. The rod 92, in sequence, has a first portion 93, a second portion 94, and a third portion 95, whose diameters are sequentially decreased, and further has a fourth portion 96 whose diameter equals to or slightly smaller than that of the second portion 94. When the rod 92 is inserted into the circular wheel 90 and through a central aperture 97 to the extent that the circular wheel 90 is aligned with the second portion 94, the third portion 95 is gripped by an elastic restricting element 91 and then the circular wheel 90 is secured to the rod 92 to prevent the circular wheel 90 from escaping out of the rod 92.

However, because the spring force of the restricting element 91 is very strong, it is necessary to use tools to assemble and disassemble the circular wheel 90 and the restricting element, which is inconvenient for the consumers. On the other hand, it takes a long time to assemble and disassemble all the elements of the wheel unit sequentially. Furthermore, the restricting element 91 which is small in size is apt to be lost, because the restricting element 91 and the circular wheel 90 are separated from each other after they are dismounted from the wheel unit 9. In addition, the favorable viewing of the wheel unit 9 or even the whole stroller is badly affected due to the protrusion of the restricting element 91 and the fourth portion 96 of the rod 92 beyond the outer surface of the circular wheel 90.

SUMMARY OF THE INVENTION

Accordingly, the present invention relates to a wheel device with quick-releasing mechanism that can substantially obviate one or more of the problems due to the limitations and disadvantages of the related arts.

One object of the present invention is the provision of a wheel device with quick-releasing mechanism which can be conveniently assembled and disassembled without the use of any tool.

Another object of the present invention is the provision of a wheel device with quick-releasing mechanism, some of whose components are connected together so as to be easily assembled and disassembled and spare time.

A further object of the present invention is the provision of a wheel device with quick-releasing mechanism, some of whose components are connected together so as to avoid losing any component after being assembled and disassembled.

A yet object of the present invention is the provision of a wheel device with a quick-releasing mechanism and a simplified appearance.

Additional features and advantages of the invention will be set forth in the description which follows, and in part will be apparent from the description, or may be learned by practice of the invention. The objectives and advantages of the invention will be realized and attained by the structure particularly pointed out in the written description and claims hereof as well as the appended drawings.

To achieve these and other advantages and according to the purpose of the present invention, as embodied and broadly described, a wheel device with quick-releasing mechanism for being mounted to a shaft which has a first section with a larger diameter and a second section with a smaller diameter, the wheel device comprising: a wheel body having a hole at a center of the wheel body thereof for accommodating the shaft; and a movable member movably mounted to the wheel body and having a first wall surface and a second wall surface which is situated in different planes with the first wall surface, a distance between the first wall surface and the center of the wheel body being larger than that between the second wall surface and the center of the wheel body; whereby the wheel body can be removed from the shaft when the movable member is set at a first position and the first wall surface is aligned with the second section of the shaft, and the first section of the shaft is blocked by the second wall surface so that the wheel body is restricted on the shaft by the movable member when the movable member is set at a second position and the second wall surface is aligned with the second section of the shaft.

It is preferred that the movable member has two first wall surfaces and two second wall surfaces to define a first chamber and a second chamber which reaches to the first chamber and is different in size from the first chamber. The size of the first chamber is larger than those of the first and the second sections, and the size of the second chamber is between those of the first and the second sections. The wheel body can be removed from the shaft when the second section is accepted in the first chamber, and the wheel body is restricted on the shaft by the movable member when the second section is accepted in second chamber.

It is preferred that the wheel body further has an elastic element contacted with the movable member which functions as a positioning member for the movable member to usually keep the movable member at the state of the second wall surface being aligned with the second section.

It is preferred that the movable member further has a protrusion between the first wall surface and the second wall surface, which functions as a positioning member for the movable member to usually keep the movable member at the state of the second wall surface being aligned with the second section.

It is preferred that the wheel body has a plurality of ribs to guide the movement of the movable member.

It is preferred that the wheel body has a first wheel plate and a second wheel body connected to each other by the ribs. The first wheel plate is connected with the movable member and the second wheel plate has a cavity to accept the first section.

It is preferred that the wheel body has at least a tab and the movable member has at least a snick. The tab is engaged with the snick to restrict the movement of the movable member in a predetermined stroke.

It is preferred that the movable member comprises at least a first board having the first wall surface and the second wall surface, and a second board having the at least the snick.

It is preferred that the wheel body further has an elastic element or the movable member further has a protrusion, which is functioned as a positioning member for the movable member to usually keep the movable member at the state of the second wall surface being aligned with the second section, and the wheel body has a first wheel plate and a second wheel plate connected to each other by the ribs, wherein the first wheel plate is connected with the movable member and the second wheel plate has a cavity to accept the first section.

It is preferred that the elastic element is integrally formed with the wheel body.

It is preferred that the elastic element and the wheel body are respectively formed and then assembled together.

It is to be understood that both the forgoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION OF THE INVENTION

Figure 1:
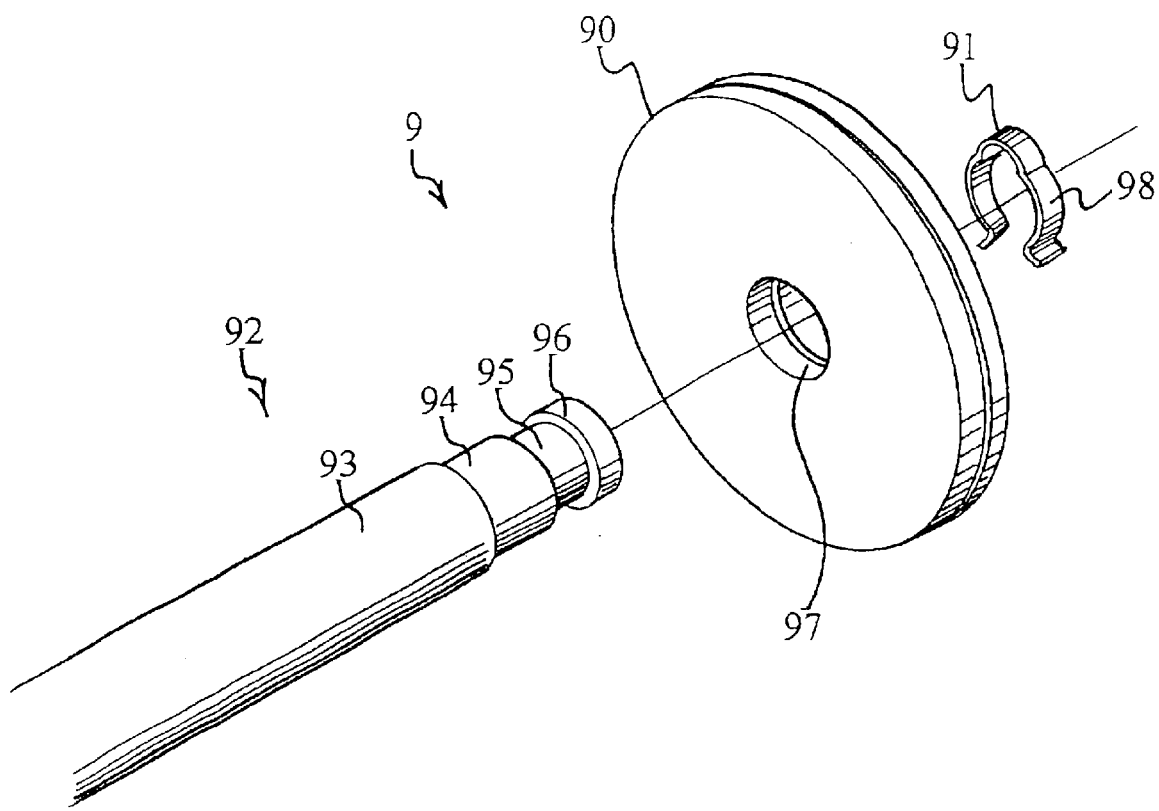
FIG. 1 is an exploded perspective view illustrating a conventional wheel unit.
Figure 2:
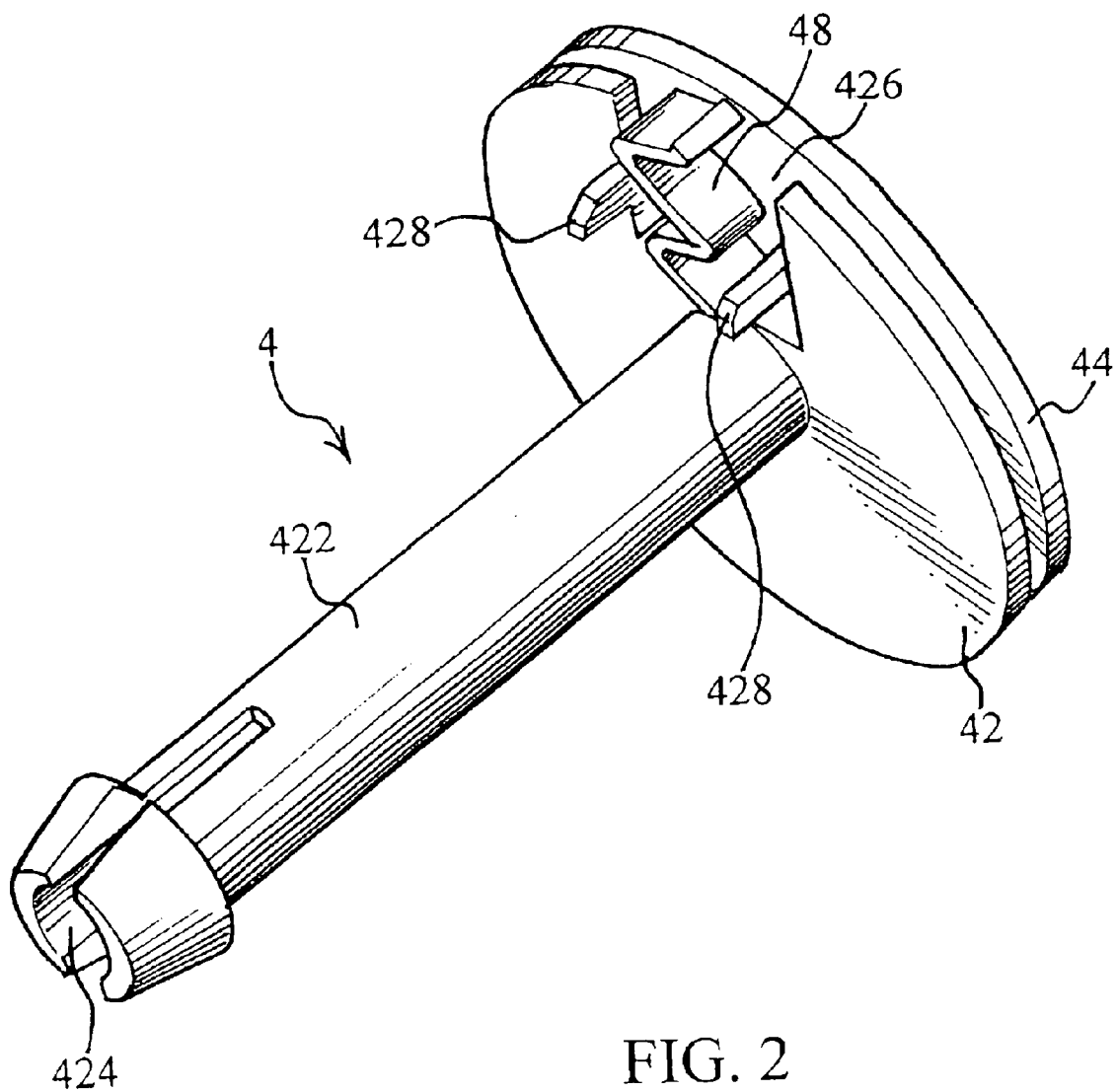
FIG. 2 is a perspective view illustrating the wheel device with quick-releasing mechanism according to the present invention, whose movable member is omitted.
Figure 3:
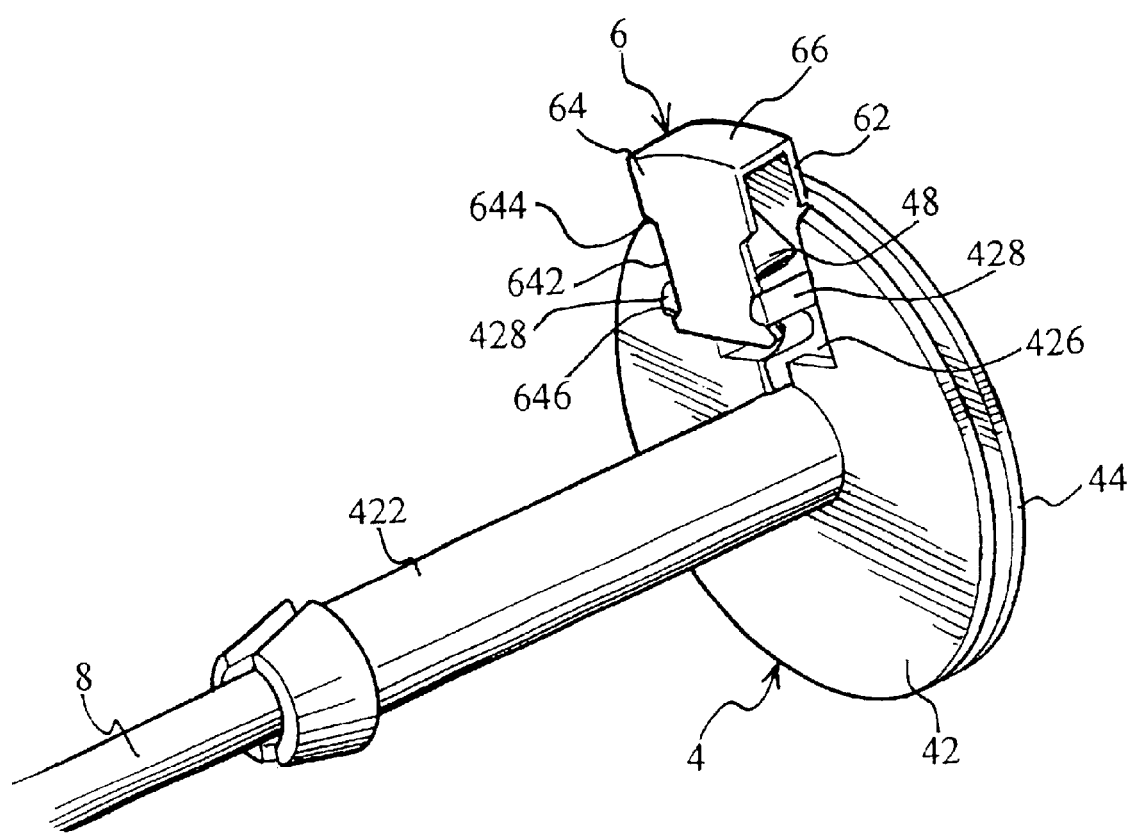
FIG. 3 is an assembled perspective view of the wheel device according to the present invention and a shaft.
Figure 4:
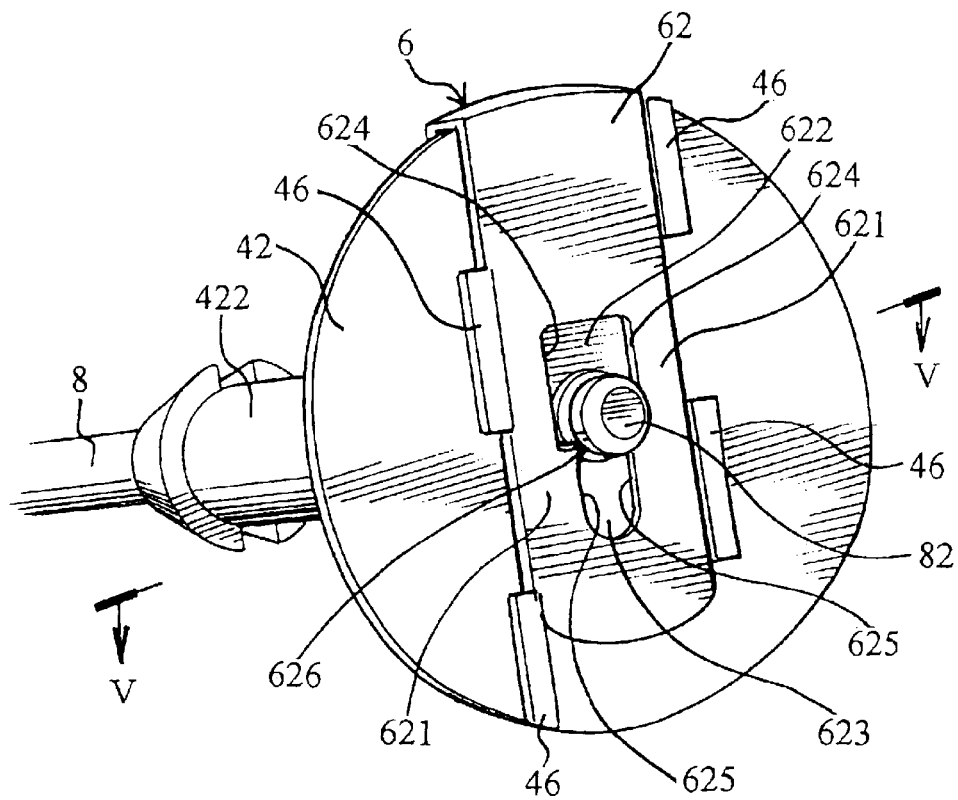
FIG. 4 is a perspective view of the wheel device with the quick-releasing mechanism according to the present invention, illustrating that a movable member is in a state of allowing a wheel body to be disassembled or assembled and that a second wheel plate is omitted.
Figure 5:
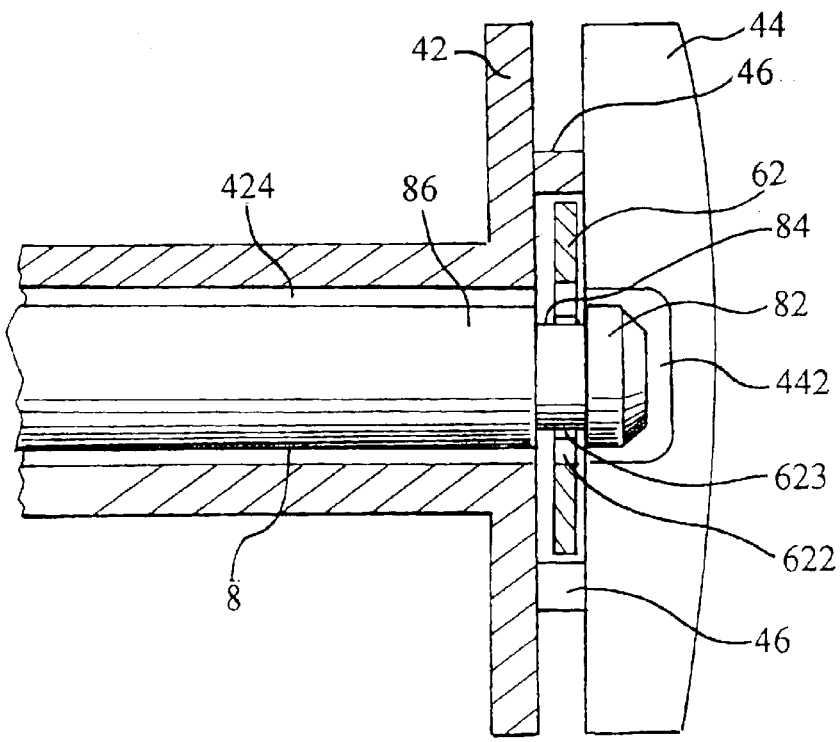
FIG. 5 is a sectional view taken along a line V—V in FIG. 4, illustrating that a movable member is in a state of allowing a wheel body to be disassembled or assembled.

As shown in FIGS. 2, 3, 4 and 5, a wheel device with a quick-releasing mechanism 2 according to the present application comprises a circular wheel body 4 and a U-shaped movable member 6.

The wheel body 4 further includes a first wheel plate 42, a second wheel plate 44 parallel to the first wheel plate 42, a plurality of ribs 46 integrally formed between and used for connecting the first wheel plate 42 and the second wheel plate 44, and an elastic element 48.

The first wheel plate 42 has a hub 422 perpendicularly extending from the first wheel plate 42 to the direction far away from the second wheel plate 44, a hole 424 in the central portions of the first wheel plate 42 and the hub 422, a rectangular recess 426 ranging from one fourth of diameter to the circumference, and two parallel tabs 428 respectively extending from the first plate 42 at two sides of the recess 426 to a direction parallel with the hub 422.

The second wheel plate 44 has a blind cavity 442, aligned with the hole 424 of the first wheel plate 42, at the central portion of a surface thereof near the first wheel plate 42.

The elastic element 48 is integrally formed with and radically extends from the periphery of the hub 422, and is accommodated within the recess 426 in such a way that there is a clearance between the elastic element 48 and the sidewalls which define the recess 426. Alternatively, the elastic element 48 can also be integrally formed from the bottom wall which define the recess 426, or the elastic element 48 and the first wheel plate 42 are respectively formed and then are assembled and connected together.

The movable member 6 includes a longer first board 62, a shorter second board 64 parallel to the first board 62, and a bridging board 66 which connects one ends of the first board 62 and the second board 64.

The upper portion of the first board 62 is solid. However the lower portion of the first board 62 includes two slats 621 whose lower ends extends toward each other and are connected together to define an upper and wider first chamber 622 and a lower and narrower second chamber 623 which reach to the first chamber. The first chamber 622 is defined by the first wall surfaces 624 of the two slats 621 and the second chamber 623 is defined by the second wall surfaces 625 of the two slats 621. Besides, each slat 621 has a protrusion 626 between each first wall surface 624 and each second wall surface 625.

The I-shaped second board 64 has two snicks 642 respectively at the central portions of two sides thereof, and two upper shoulders 644 and two lower shoulders 646 respectively at tops and bottoms of each snick 642.

The shaft 8 includes a first section 82, a second section 84, and a third section 86 from the free end thereof to the central portion. The sizes of diameters from large to small in sequence are those of the third section 86, the first section 82, and the second section 84. Alternatively, the sizes of diameters of the first section 82 and the third section 86 can also equal to each other.

When the wheel device with quick-releasing mechanism 2 is assembled, the first board 2 of the movable member 6 is, at first, inserted into the space defined by the first wheel plate 42, the second wheel plate 44, and the ribs 46, and simultaneously the two tabs 428 snap into the two snicks 642 respectively situated at two sides of the second board 64 by the aids of the flexibility of the second board 64 or the tabs 428 so as to slidably secure the movable member 6 to the wheel body 4.

Next, the movable member 6 is pressed to compress the elastic element 48 and thus, under the guidance of the ribs 46, is slid toward the center of the wheel body 4 to the extent that the two tabs 428 are near the upper shoulders 644 of the second board 64 and the hole 424 is aligned with the first chamber 623 of the first board 62. At this time, the shaft 8 is inserted into the hole 424 of the hub 422 and then in sequence penetrates through the hole 424 of the first wheel plate 42 and the first chamber 622 of the first board 62 to make the first section 82 is accepted within the cavity 442 of the second wheel plate 44, the second section 84 is accepted within the first chamber 622, and the third section 86 is accepted within the hole 424 of the first wheel plate 42 and the hub 422. At this state, the assembling and disassembling between the wheel body 4 and the shaft 8 is allowed because the transverse width of the first chamber 622 is larger than the diameter of the first section 82 of the shaft 8.

Figure 6:
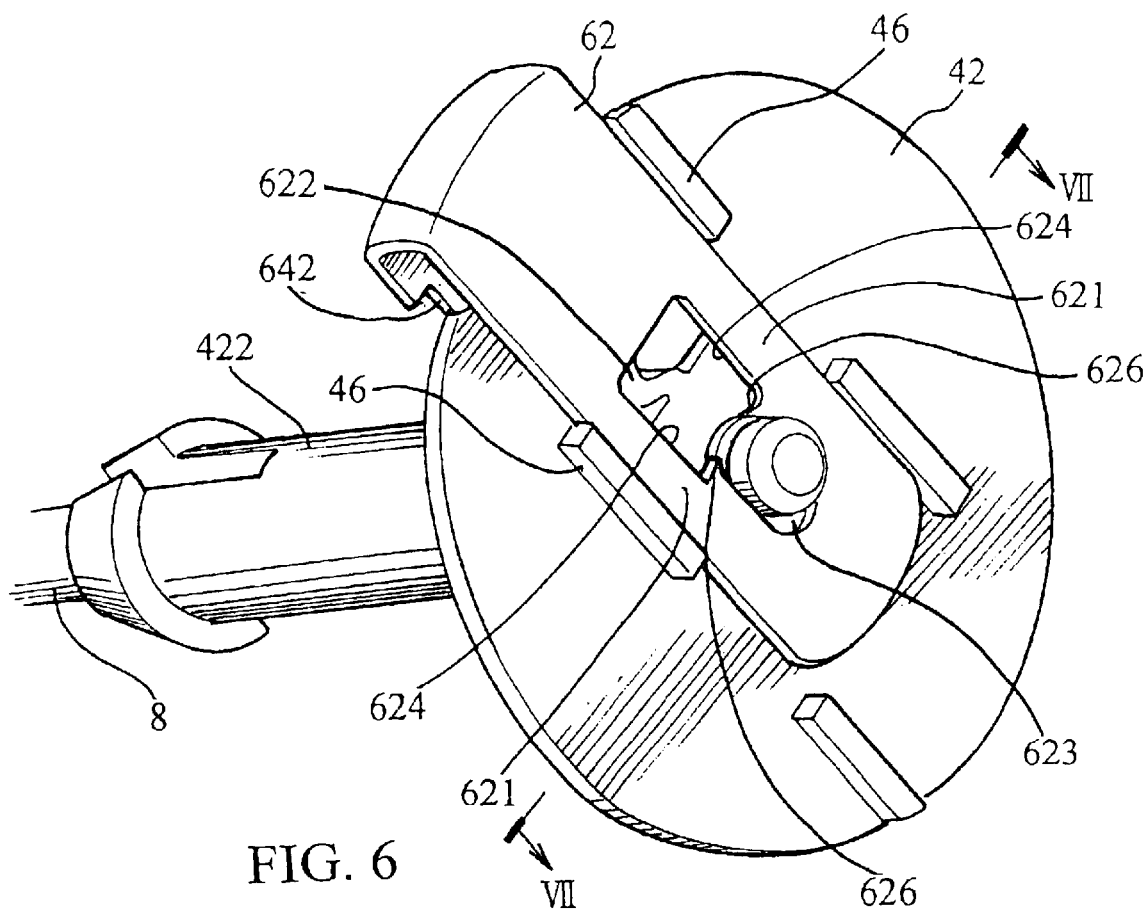
FIG. 6 is a perspective view of the wheel device with quick-releasing mechanism according to the present invention, illustrating that a movable member is in a state of restricting the wheel body from being removed out of the shaft and that a second wheel plate is omitted.
Figure 7:
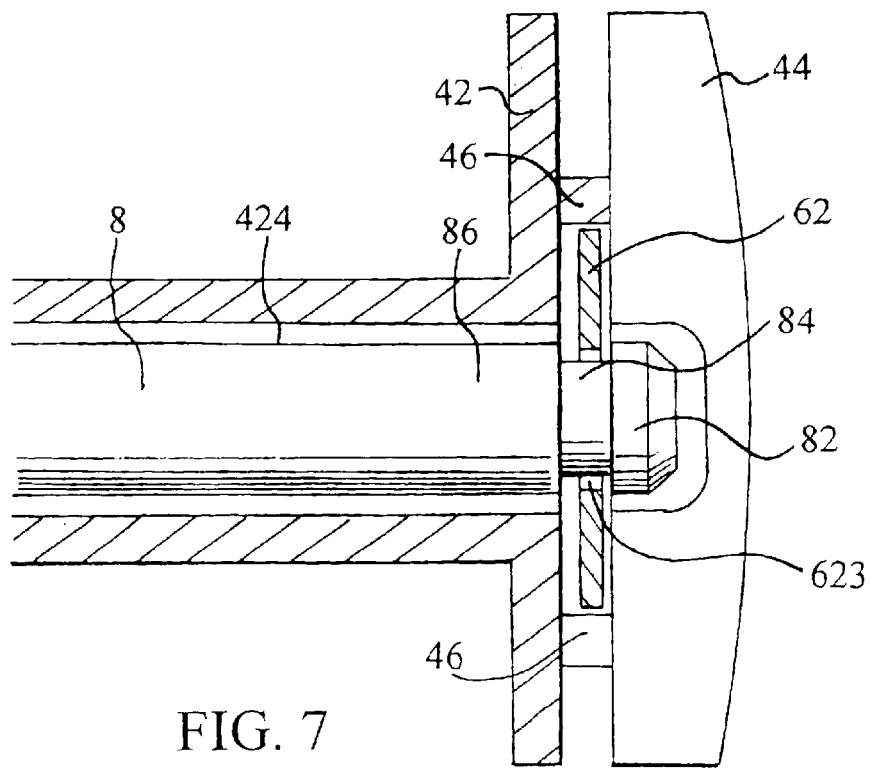
FIG. 7 is a sectional view taken along a line VII—VII in FIG. 6, illustrating that a movable member is in a state of restricting the wheel body from being removed out of the shaft.

As shown in FIGS. 6 and 7, when the movable member 6 is pulled outwardly, and by the aids of restoration force of the elastic element 48, the movable member 6 is radically slid outwardly to the extent that the two tabs 428 is near the lower shoulders 646 of the second board 64. In the meanwhile, the second section 84 is snapped over the protrusions 626 of the first board 62 and accepted in the second chamber 623. At this state, because the width of the second chamber 623 is larger than the diameter of the second section 84 of the shaft 8, but smaller than that of the first section 82, the wheel body 4 and the shaft 8 can be firmly connected together by the first board 64 of the movable member 6, but the wheel body 4 is still rotatable relative to the shaft 8.

In addition, in the above state of the wheel body 4 and the shaft 8 being connected together, because the movement of the shaft 8 is restricted by the protrusions 626 and/or the bridging board 66 of the movable member 6 is abutted against by the elastic element 48, the state of the second section 84 of the shaft 8 being accepted in the second chamber 623 of the first board 62 can be maintained even if the movable member 6 no more be held by an external force. Therefore, both the protrusions 626 and the elastic element 48 have the function like a positioning member.

Accordingly, the only thing needed to do for assembling and disassembling the wheel body with the shaft 8 according to the present invention is to pull or push the movable member 6 which has quick-releasing function. Because there is no necessity of tools, it is convenient for the users to carry out the operations of assembling and disassembling. On the other hand, because the movable member 6 is restricted and connected to the first wheel plate 42 as a whole by the tabs 428, but as a whole all parts of the wheel device 2 need not be assembled and disassembled one by one, which is easy and can be accomplished rather quickly. Furthermore, because the movable member 6 is connected to the first wheel plate 42 as a whole, there is no risk of losing any part, such as the movable member, after the wheel body 4 is dismounted from the shaft 8. Besides, because the first section 82 of the shaft 8 is covered by the second wheel plate 44, the appearance of the whole wheel device with quick-releasing mechanism 2 is simplified.

In another preferred embodiment according to the present invention, the first board 62 can have only one slat 621 instead of two slats 621 in forgoing preferred embodiment. Because the distance between the first wall surface 624 of the only one slat 621 and the central axis of the shaft 8 is large than that between the second wall surface 625 and the central axis of the shaft 8, when the movable member 6 is situated at a first position, that is, the first wall surface 624 is aligned with the second section 84 of the shaft 8, the wheel body 4 is allowed to be escaped from the shaft 8; when the movable member 6 is situated at a second position, that is, the second wall surface 625 is aligned with the second section 84 of the shaft 8, the wheel body 4 is restricted to the shaft 8 by the movable member 6 due to the first section 82 being blocked by the second wall surface 625. Therefore, the second preferred embodiment also has the above functions described in the first preferred embodiment and thus can achieve the objects of the present invention.

This invention has been disclosed in terms of specific embodiments. It will be apparent that many modifications can be made to the disclosed structures without departing from the invention. Therefore, it is the intent of the appended claims to cover all such variations and modifications as come within the true spirit and scope of this invention.

What is claimed is:

1. A wheel device with a quick-releasing mechanism for being mounted to a shaft which has a first section with a larger diameter and a second section with a smaller diameter, the wheel device comprising
   a wheel body having an elastic element integrally formed with the wheel body and a hole at the center of the wheel body for accommodating the shaft; and
   a movable member movably mounted to the wheel body and contacted with the elastic element, and the movable member having a first wall surface and a second wall surface which is situated in different planes with the first wall surface, a distance between the first wall surface and the center of the wheel body being larger than that between the second wall surface and the center of the wheel body;
   whereby the wheel body can be removed from the shaft when the movable member is set at a first position and the first wall surface is aligned with the second section of the shaft, and the first section of the shaft is blocked by the second wall surface so that the wheel body is restricted on the shaft by the movable member when the movable member is set at a second position and the second wall surface is aligned with the second section of the shaft.

2. The wheel device with a quick-releasing mechanism as claimed in claim 1, wherein the movable member has two first wall surfaces and two second wall surfaces to respectively define a first chamber and a second chamber which opens into the first chamber and is different from the first chamber in size, wherein the size of the first chamber is larger than those of the first and the second sections, and the size of the second chamber is between those of the first and the second sections;
   whereby the wheel body can be removed from the shaft when the second section is accepted in the first chamber, and the wheel body is restricted on the shaft by the movable member when the second section is accepted in the second chamber.

3. The wheel device with a quick-releasing mechanism as claimed in claim 1 or 2, wherein the elastic element functions as a positioning member for the movable member to urge the second wall surface of the movable member being aligned with the second section.

4. The wheel device with a quick-releasing mechanism as claimed in claim 3, wherein the elastic element and the wheel body are respectively formed and then assembled together.

5. The wheel device with a quick-releasing mechanism as claimed in claim 1 or 2, wherein the movable member further has a protrusion between the first wall surface and the second wall surface, which functions as a positioning member for the movable member to urge the second wall surface of the movable member being aligned with the second section.

6. The wheel device with a quick-releasing mechanism as claimed in claim 1 or 2, wherein the movable member further has a protrusion between the first wall surface and the second wall surface, the elastic element and the protrusion functioning as positioning members for the movable member to urge the second wall surface of the movable member being aligned with the second section.

7. The wheel device with a quick-releasing mechanism as claimed in claim 1 or 2, wherein the wheel body has a plurality of ribs to guide the movement of the movable member.

8. The wheel device with a quick-releasing mechanism as claimed in claim 7, wherein the wheel body has a first wheel plate and a second wheel body connected each other by the ribs, wherein the first wheel plate is connected with the movable member and the second wheel plate has a cavity to accept the first section.

9. The wheel device with a quick-releasing mechanism as claimed in claim 1 or 2, wherein the wheel body has at least a tab and the movable member has at least a snick, and the at least the tab is engaged with the at least the snick to restrict the movement of the movable member in a predetermined stroke.

10. The wheel device with a quick-releasing mechanism as claimed in claim 9, wherein the movable member comprises at least a first board having the first wall surface and the second wall surface, and a second board having the at least the snick.

11. The wheel device with a quick-releasing mechanism as claimed in claim 1 or 2, wherein the wheel body further has an elastic element or the movable member further has a protrusion, which is functioned as a positioning member for the movable member to usually keep the movable member at the state of the second wall surface being aligned with the second section, and the wheel body has a first wheel plate and a second wheel plate connected each other by the ribs, wherein the first wheel plate is connected with the movable member and the second wheel plate has a cavity to accept the first section.

* * * * *